United States Patent
Chen (10) Patent No.: US 8,014,021 B2
(45) Date of Patent: Sep. 6, 2011

(54) IMAGE PROCESSING METHOD AND APPARATUS FOR AUTOMATICALLY ATTACHING A DESIGNATED TEXT/GRAPH ON AN IMAGE

(75) Inventor: Chien Ming Chen, Taipei (TW)

(73) Assignee: Teco Image Systems Co., Ltd., Taipei (TW)

( * ) Notice: Subject to any disclaimer, the term of this patent is extended or adjusted under 35 U.S.C. 154(b) by 1253 days.

(21) Appl. No.: 11/647,262

(22) Filed: Dec. 29, 2006

(65) Prior Publication Data
US 2008/0068658 A1 Mar. 20, 2008

(30) Foreign Application Priority Data
Sep. 19, 2006 (TW) ................ 95134619 A (51) Int. Cl.
*G06K 15/00* (2006.01)

(52) U.S. Cl. ....... 358/1.18; 358/462; 358/448; 358/473; 358/450; 358/1.1; 382/176; 382/173; 382/289; 382/172; 382/290

(58) Field of Classification Search ............. 358/1.18, 358/1.1, 462, 448, 451, 461, 473, 450; 382/172, 382/168, 290, 297, 195, 176, 173, 264, 284, 203, 289
See application file for complete search history.

(56) References Cited

U.S. PATENT DOCUMENTS

| | | | | | |
|---|---|---|---|---|---|
| 5,077,811 | A | * | 12/1991 | Onda | 382/290 |
| 5,450,502 | A | * | 9/1995 | Eschbach et al. | 382/169 |
| 5,862,249 | A | * | 1/1999 | Jang et al. | 382/132 |
| 6,711,291 | B1 | * | 3/2004 | Stubler et al. | 382/195 |
| 2006/0126932 | A1 | * | 6/2006 | Eschbach | 382/173 |

* cited by examiner

Primary Examiner — Benny Tieu
Assistant Examiner — Martin Mushambo
(74) Attorney, Agent, or Firm — Bacon & Thomas, PLLC (57) ABSTRACT

An image processing method includes the following steps. Firstly, a specified digital image and a designated text/graph are retrieved. Then, the specified digital image is processed to obtain image information associated with a right-side-up image of the specified digital image. Afterwards, the designated text/graph is automatically adjusted and attached on a specified position relative to the right-side-up image according to the image information, thereby printing the specified digital image and the designated text/graph.

19 Claims, 10 Drawing Sheets

IMAGE PROCESSING METHOD AND APPARATUS FOR AUTOMATICALLY ATTACHING A DESIGNATED TEXT/GRAPH ON AN IMAGE

FIELD OF THE INVENTION

The present invention relates to an image processing method, and more particularly to an image processing method for automatically attaching a designated text/graph on an image. The present invention also relates to an image printing apparatus using such an image processing method.

BACKGROUND OF THE INVENTION

With increasing development of image processing technologies, digital image capture apparatuses such as digital still cameras have experienced great growth and are rapidly gaining in popularity. Since these digital image capture apparatuses are portable and convenient, they become essential electronic devices in our daily lives. Generally, the digital image captured by the digital image capture apparatus are shown on a screen such as a LCD screen, or directly outputted through an image printing apparatus such as a printer or a multifunction peripheral.

Conventionally, the digital image data captured by the digital image capture apparatus are transmitted to a computer and optionally processed by the computer. In response to execution of specified image processing software, the processed digital image data are transmitted to the image printing device which is linked thereto for printing. Unfortunately, the operating interface of the computer is quite complex, particularly for the uneducated users. The complicated operating interface becomes hindrance from using the digital image capture apparatus. Even if the user is well-educated in operating computer, the processes of learning operations of the image processing software and selecting desired parameters for printing are not user-friendly. In December of 2002, several manufacturers of printers and digital cameras cooperatively published a Direct Print Standard (DPS) and the commercial products that resulted from the initiative are referred to as "PictBridge". By means of this specification "PictBridge", the digital camera can be connected to a printer without the assistance of a computer so as to directly transfer images from the digital camera to the printer. Please refer to FIG. 1. With PictBridge, after the images have been captured by a digital image capture apparatus 12, the digital image capture apparatus 12 is connected to a printer 11 via a USB cable 13. PictBridge takes care of all the details, no matter what brand of camera or printer you use. As a consequence, the digital image data may be directly printed from the digital image capture apparatus 12 without the assistance of a computer.

Figure 1:
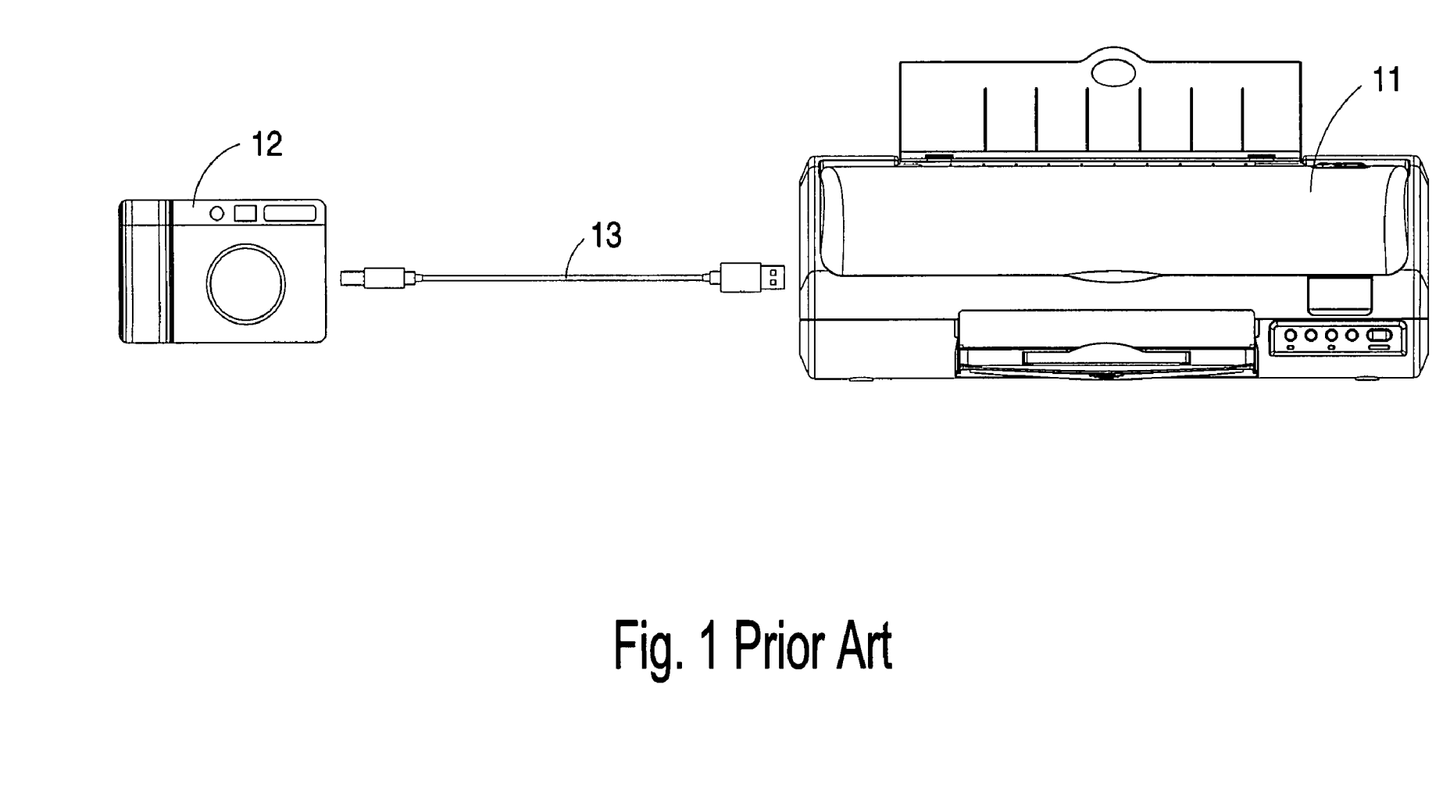
FIG. 1 is a schematic view illustrating the connection between an image printing apparatus and a digital image capture apparatus according to prior art.

Depending on the brands of the printer 11 and the digital image capture apparatus 12, the functions of direct printing are varied. In addition to the function of directly printing the photographs which are taken by the digital image capture apparatus 12, the printer 11 has other extended functions. For example, designated text/graph such as date, file name and/or image index may be automatically attached onto specified photographs. In addition, media size and image size can be specified by the printer 11. For example, it is possible to print a digital image onto a single A4 sheet, print several different digital images on a single A4 sheet or print several copies of the same picture at a time.

Figure 2:
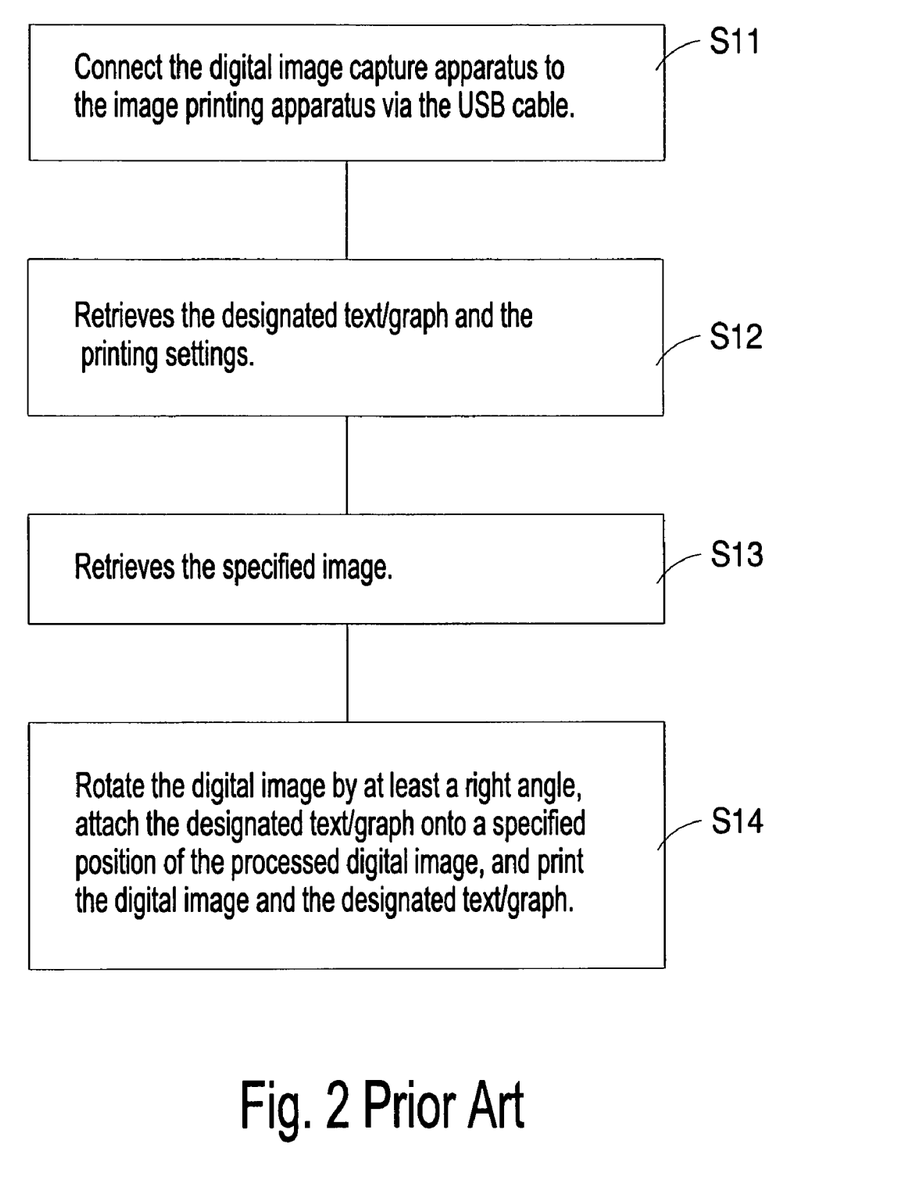
FIG. 2 is a flowchart illustrating a process of automatically attaching the designated text/graph on the specified image according to prior art.

Hereinafter, a process of automatically attaching the designated text/graph on the specified image will be illustrated with reference to FIG. 2 and also FIG. 1. First of all, the digital image capture apparatus 12 is connected to the printer 11 via the USB cable 13 (step S11). Then, the designated text/graph to be attached on the specified image and the printing settings are retrieved by the printer 11 (step S12). Then, the digital image to be printed is retrieved by the printer 11 (step S13). Afterwards, by means of the printer 11, the digital image is rotated by at least a right angle, the designated text/graph is attached onto a specified position of the adjusted digital image, and then the digital image and the designated text/graph are together printed out (step S14). Generally, the procedure of rotating the digital image by at least a right angle makes the adjusted image maximized or optimized. The specified position is at a fixed corner of the adjusted image.

Figure 3A:
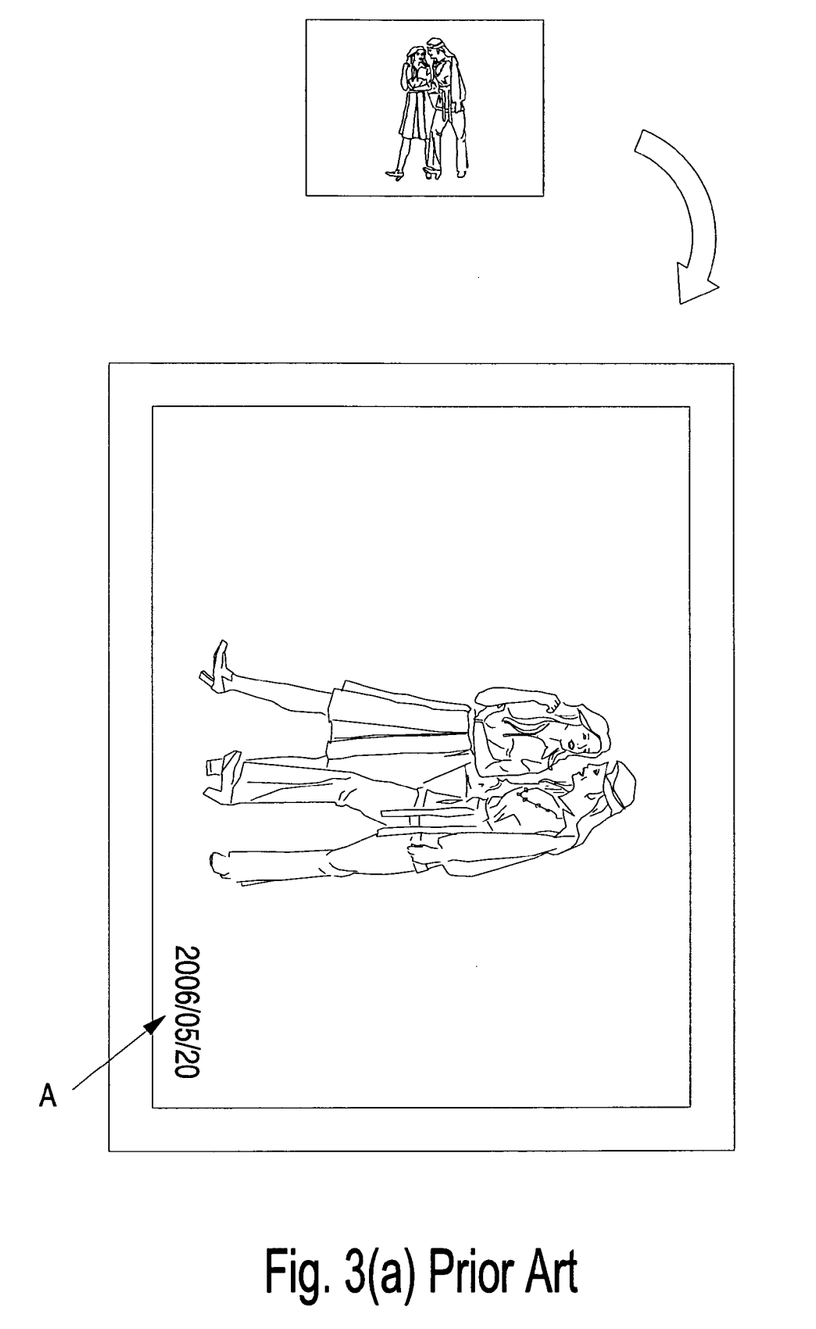
FIG. 3(a) schematically illustrates an image selected to be printed on a single A4 sheet according to prior art.
Figure 3B:
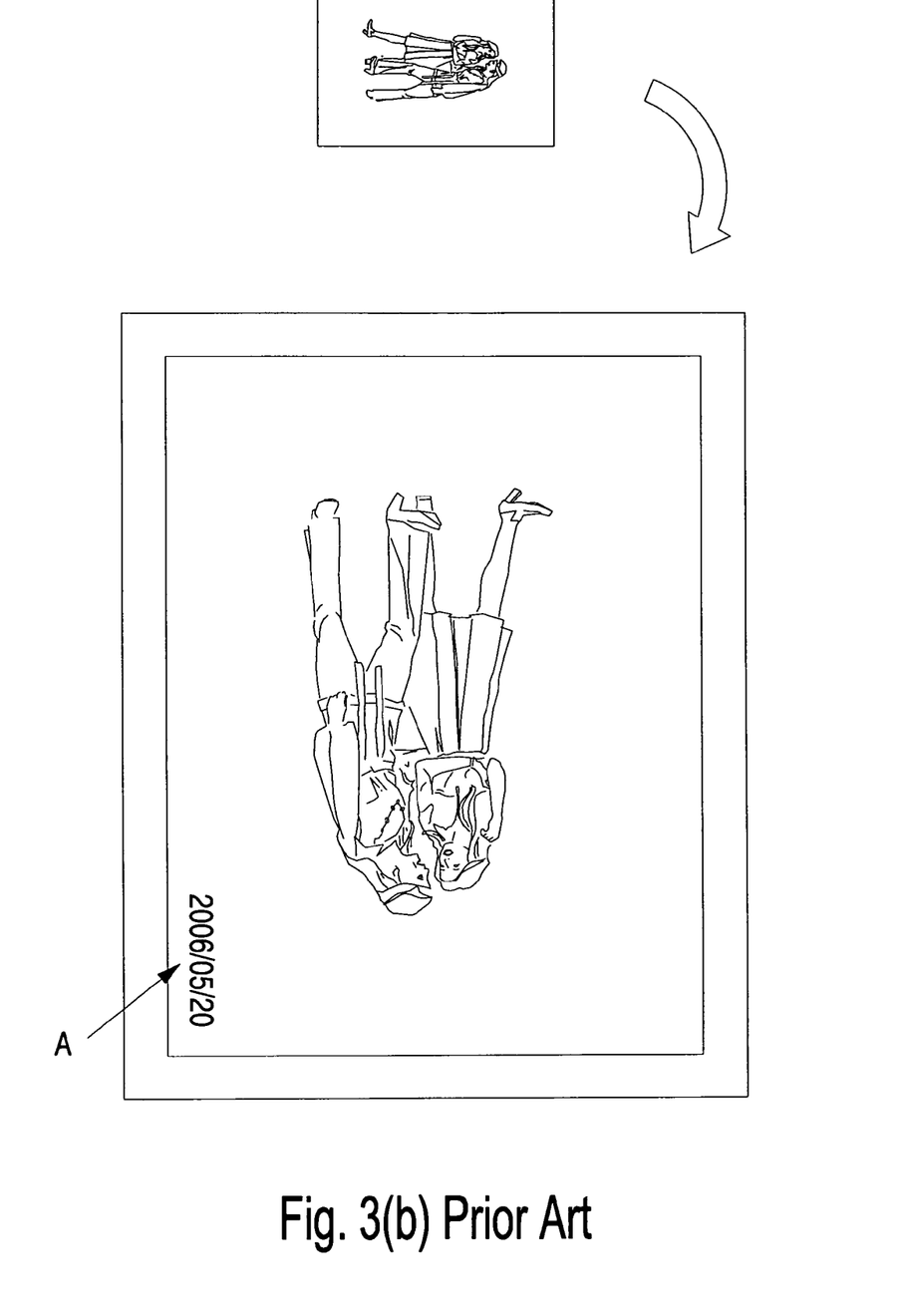
FIG. 3(b) schematically illustrates another image selected to be printed on a single A4 sheet according to prior art.

For example, as shown in FIG. 3(a), an image taken or captured by the digital image capture apparatus 12 is selected to be printed on a single A4 sheet. In the step S14, the selected image is rotated by at least a right angle and the designated text/graph is attached onto a specified position A, for example a lower right corner. Unfortunately, the position of the designated text/graph relative to the image is sometimes undesired. For example, as shown in FIG. 3(b), the digital image capture apparatus 12 had been rotated by a right angle in the clockwise direction before the image is taken or captured. In the step S14, the selected image is also rotated by at least a right angle and the designated text/graph is attached onto the specified position A, for example the lower right corner. Generally, the position of the designated text/graph relative to the image at this case is deemed as a defective position.

As previously described, the conventional process of automatically attaching the designated text/graph on the specified image has several drawbacks. For example, since the orientation of the selected image is not ascertained and the designated text/graph is attached onto a fixed position, the position of the designated text/graph relative to the image is usually undesirable. In addition, since the background color of the image is possibly non-uniform in brightness, the color of the designated text/graph may be close to the background color, and the designated text/graph will be unrecognizable.

In views of the above-described disadvantages resulted from the prior art, the applicant keeps on carving unflaggingly to develop an image processing method and an image printing apparatus according to the present invention through wholehearted experience and research.

SUMMARY OF THE INVENTION

It is an object of the present invention to provide an image printing method and an image printing apparatus for increasing the correctness of discriminating the most possible upper section of the right-side-up image without impairing the processing speed of the image printing apparatus.

Another object of the present invention is to provide an image printing method and an image printing apparatus for automatically adjusting or intensifying the designated text/graph according to the average gray level of the specific position, so that the designated text/graph is more recognizable.

In accordance with an aspect of the present invention, there is provided an image processing method for use with an image printing apparatus. The image processing method includes the steps of: (a) retrieving a specified digital image and a designated text/graph; (b) processing the specified digital image, thereby obtaining image information associated with a right-side-up image of the specified digital image; and (c) automatically adjusting and attaching the designated text/graph on a specified position relative to the right-side-up image according to the image information, thereby printing the specified digital image and the designated text/graph.

In accordance with another aspect of the present invention, there is provided an image processing method for use with an image printing apparatus. The image processing method includes the steps of: (a) retrieving a specified digital image and a designated text/graph; (b) processing the specified digital image, thereby obtaining image information associated with a right-side-up image of the specified digital image; and (c) automatically intensifying the designated text/graph according to the image information and attaching the intensified text/graph on a specific position relative to the right-side-up image, thereby printing the specified digital image and the designated text/graph.

In accordance with another aspect of the present invention, there is provided an image printing apparatus. The image printing apparatus includes a processing unit, a storage unit and a printing unit. The processing unit is communicated with a digital image capture apparatus or a digital image storage device for retrieving and processing a specified digital image and a designated text/graph from the digital image capture apparatus or the digital image storage device. The storage unit is connected to the processing unit for storing therein the specified digital image and the designated text/graph. The printing unit is connected to the processing unit and controlled by the processing unit to print the processed specified digital image and the processed designated text/graph. The processing unit performs an image processing process including steps of: (a) retrieving the specified digital image and the designated text/graph; and (b) processing the specified digital image, thereby obtaining image information associated with a right-side-up image of the specified digital image.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 4:
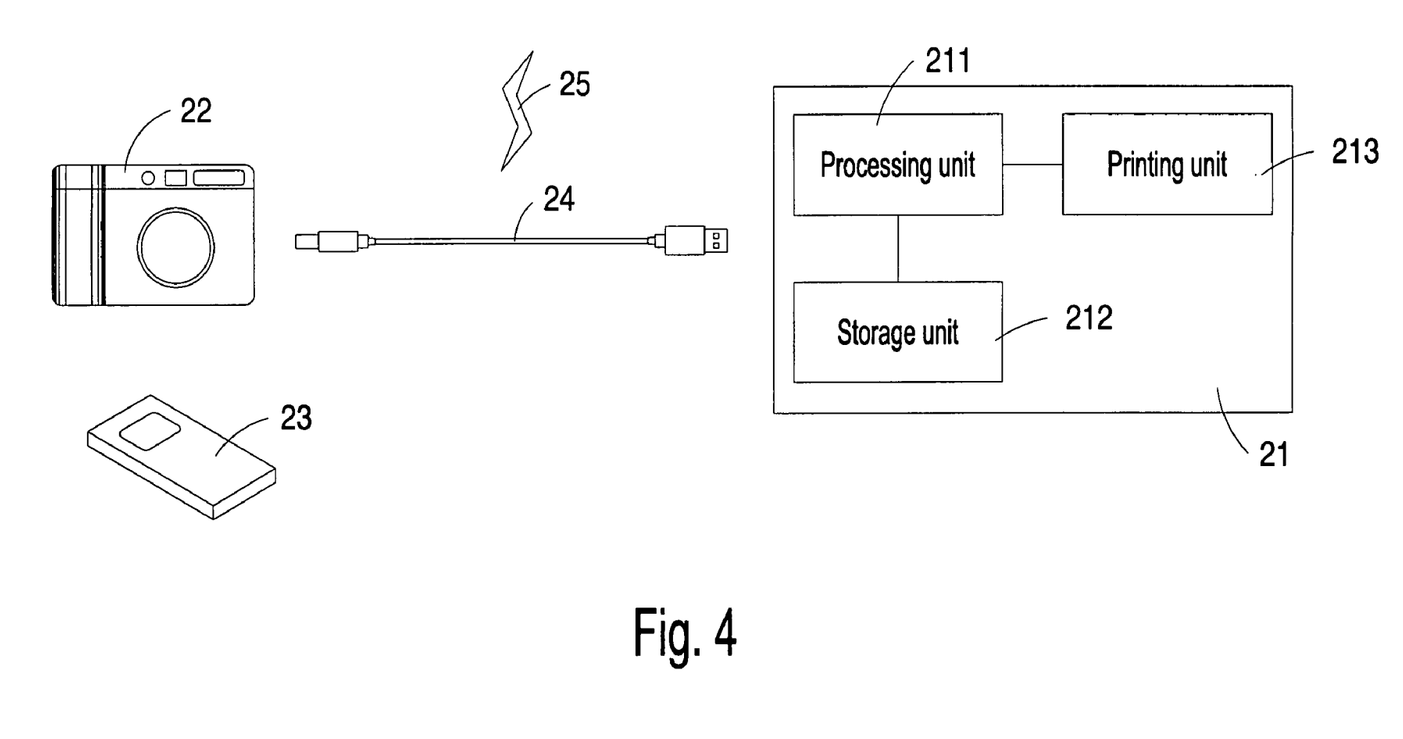
FIG. 4 is a schematic view illustrating the connection between an image printing apparatus and a digital image capture apparatus or a digital image storage device according to a preferred embodiment of the present invention.

Please refer to FIG. 4, which is a schematic view illustrating the connection between an image printing apparatus and a digital image capture apparatus or a digital image storage device according to a preferred embodiment of the present invention. As shown in FIG. 4, the image printing apparatus 21 may be communicated with the digital image capture apparatus 22 or the digital image storage device 23 via a wired connection interface 24 or a wireless connection interface 25. In some embodiments, the image printing apparatus 21 is a printer or a multifunction peripheral, the digital image capture apparatus 22 includes a digital camera or a camera phone, and the image storage device 23 is a digital image converter. The image printing apparatus 21, the digital image capture apparatus 22 and the digital image storage device 23 have direct printing functions. Via the operating interface of the image printing apparatus 21, the digital image capture apparatus 22 or the digital image storage device 23, the direct printing procedure and the procedure of the automatically attaching a designated text/graph on a specified image may be performed. In some embodiments, the image printing apparatus is a printer or a multifunction peripheral with a card reader, and the digital image storage device 23 is an electronic memory card. Under this circumstance, the digital image and the designated text/graph may have been stored in the electronic memory card. Via the operating interface of the image printing apparatus 21, the direct printing procedure and the procedure of the automatically attaching the designated text/graph on the specified image will be performed. An exemplary wired connection interface 24 is a USB cable, and the wireless connection interface 25 includes for example a Bluetooth device or a wireless network.

Please refer to FIG. 4 again. The image printing apparatus 21 principally includes a processing unit 211, a storage unit 212 and a printing unit 213. The processing unit 211 is communicated with the digital image capture apparatus 22 or the digital image storage device 23. The digital image and the designated text/graph captured or stored in the digital image capture apparatus 22 or the digital image storage device 23 are transmitted to the processing unit 211, and then processed by the processing unit 211. The storage unit 212 is connected to the processing unit 211 for storing the digital image and the designated text/graph. The printing unit 213 is connected to the processing unit 211. Under the control of the processing unit 211, the printing unit 213 prints the adjusted image along with the designated text/graph.

Figure 5:
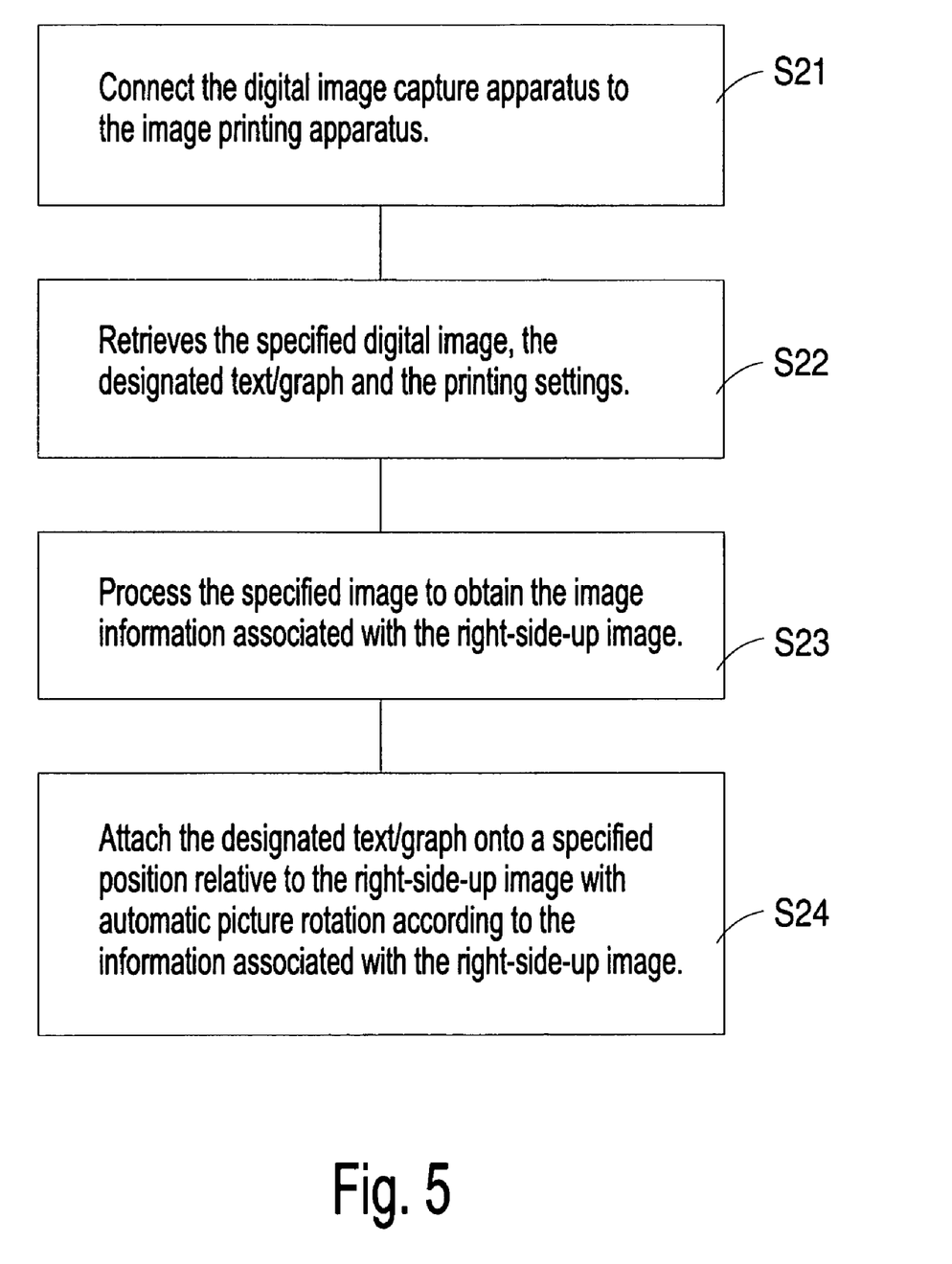
FIG. 5 is a flowchart illustrating a process of automatically attaching the designated text/graph on the specified image according to the present invention.

Hereinafter, a process of automatically attaching the designated text/graph on the specified image according to the present invention will be illustrated with reference to FIG. 5 and also FIG. 4.

First of all, the digital image capture apparatus 22 (e.g. a digital camera) is connected to the image printing apparatus 21 (e.g. a printer or a multifunction peripheral) via the wired connection interface 24 or the wireless connection interface 25 (step S21). Then, the digital image, the designated text/graph to be attached on the specified digital image and the printing settings are retrieved by the image printing apparatus 21 (step S22). Then, the specified image is processed by the image printing apparatus 21 so as to obtain the image information associated with the right-side-up image (step S23). According to the information associated with the right-side-up image, the designated text/graph is attached onto a specified position relative to the right-side-up image with automatic picture rotation (step S24). The above steps are identical in another case that the digital image capture apparatus 22 is replaced by the digital image storage device 23.

Figure 6:
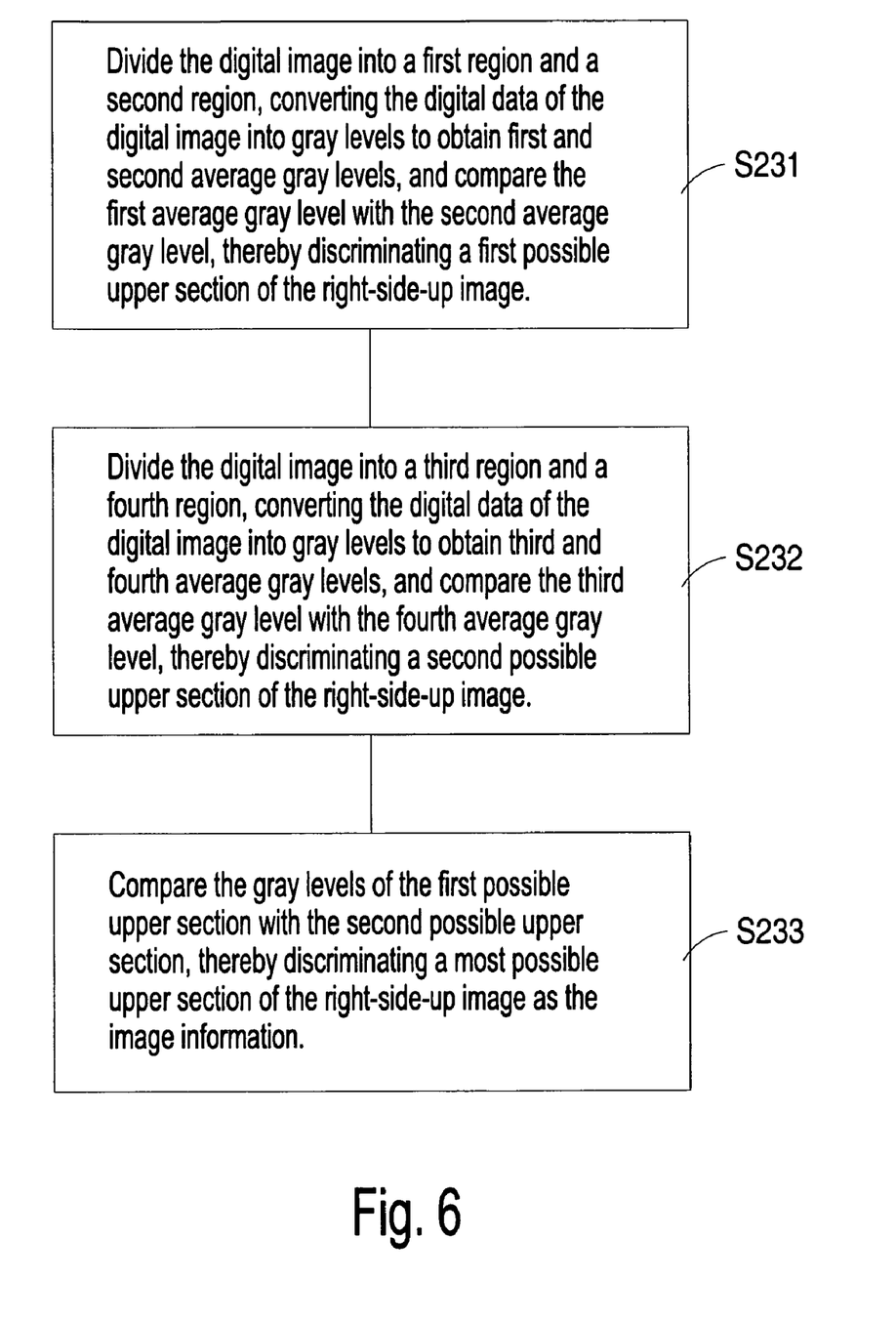
FIG. 6 is a flowchart illustrating some sub-steps of obtaining the image information associated with the right-side-up image.

The steps S23 further includes the sub-steps S231, S232 and S233, which will be illustrated with reference to FIGS. 6 and 7.

Figure 7A:
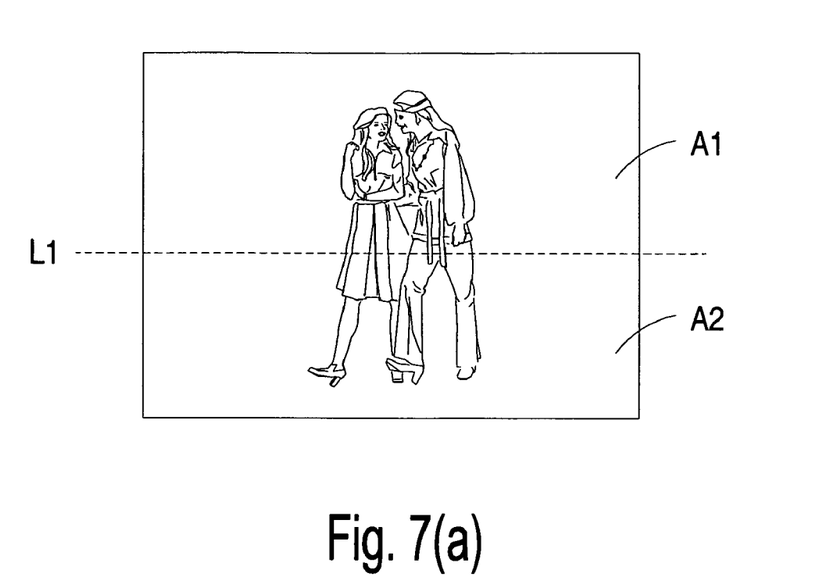
FIG. 7(a) schematically illustrates that the specified image is divided into a first section A1 and a second section A2 by a first separation line L1.

In the step S231, the specified image is divided into a first section A1 and a second section A2 by a first separation line L1, as is shown in FIG. 7(a). The digital data of the specified image are converted into gray levels, thereby obtaining a first average gray level Gray(A1) of the first section A1 and a second average gray level Gray(A2) of the second section A2. Typically, the gray levels Gray(A1) and Gray(A2) are ranged from full black (level 0) to full white (level 255). A larger gray level means a greater white intensity. Whereas, a smaller gray level means a greater black intensity. Then, the first average gray level Gray(A1) of the first section A1 is compared with the second average gray level Gray(A2) of the second section A2. If the first average gray level Gray(A1) is greater than the second average gray level Gray(A2), the first section A1 is deemed as a first possible upper section of the right-side-up image. In contrast, if the second average gray level Gray(A2) is greater than the first average gray level Gray(A1), the second section A2 is deemed as a first possible upper section of the right-side-up image.

Since the outputted picture is rectangular in size, the right side is one of the four sides of the rectangular picture. In most situations, a light source is necessary for taking or capturing the images of people, landscapes or objects regardless of working indoors or outdoors. Generally, the light source such as the sunlight or the lighting lamp is disposed above the people, landscapes or objects to be shot. That is, the upper section of the right-side-up image is brighter than the lower section of the right-side-up image. As a consequence, the first possible upper section of the right-side-up image may be initially discriminated by comparing the gray levels of these two regions A1 and A2.

Figure 7B:
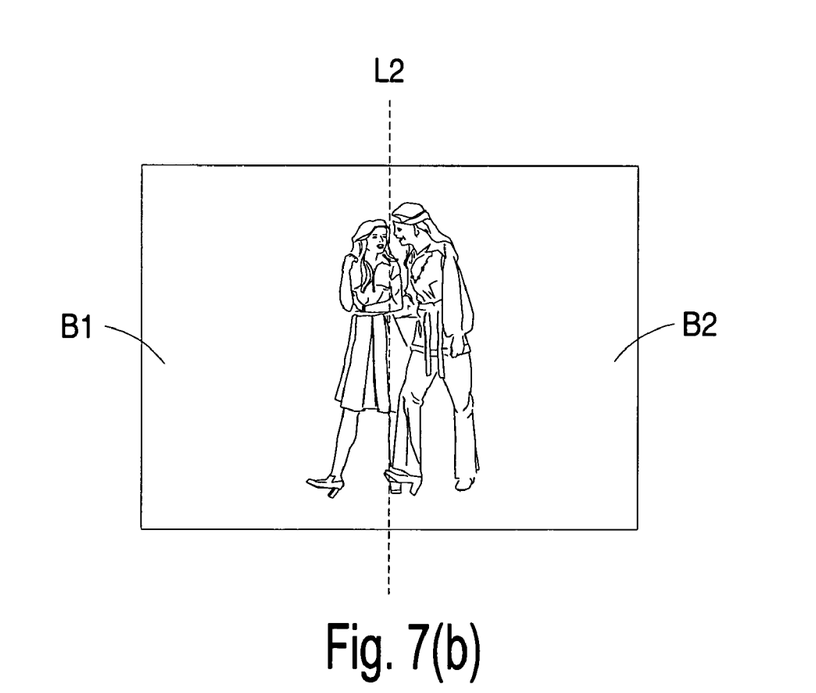
FIG. 7(b) schematically illustrates that the specified image is divided into a third section B1 and a fourth section B2 by a second separation line L2.

In the step S232, the specified image is divided into a third section B1 and a fourth section B2 by a second separation line L2, as is shown in FIG. 7(b). In this embodiment, the second separation line L2 is perpendicular to the first separation line L1. Likewise, the digital data of the specified image are converted into gray levels, thereby obtaining a third average gray level Gray(B1) of the third section B1 and a fourth average gray level Gray(B2) of the fourth section B2. Then, the third average gray level Gray(B1) of the third section B1 is compared with the fourth average gray level Gray(B2) of the fourth section B2. If the third average gray level Gray(B1) is greater than the fourth average gray level Gray(B2), the third section B1 is deemed as a second possible upper section of the right-side-up image. In contrast, if the fourth average gray level Gray(B2) is greater than the third average gray level Gray(B1), the fourth section B2 is deemed as a second possible upper section of the right-side-up image. As a consequence, the second possible upper section of the right-side-up image may be initially discriminated by comparing the gray levels of these two regions B1 and B2.

Subsequently, in the step S233, the average gray level of the first possible upper section (obtained in the step S231) is compared with the average gray level of the second possible upper section (obtained in the step S232). That is, if the first average gray level Gray(A1) of the first section A1 is greater than the third average gray level Gray(B1) of the third section B1, the first section A1 is deemed as the most possible upper section of the right-side-up image. Whereas, if the third average gray level Gray(B1) is greater than the first average gray level Gray(A1) of the first section A1, the third section B1 is deemed as the most possible upper section of the right-side-up image. Meanwhile, the information associated with the most possible upper section of the right-side-up image is determined.

The above-mentioned procedures of discriminating the image information associated with the most possible upper section of the right-side-up image are very convenient and simple. In addition, the correctness of discriminating the most possible upper section is largely increased without impairing the processing speed of the processing unit 211 of the image printing apparatus 21. Since the most possible upper section of the right-side-up image is determined, the position of the designated text/graph relative to the right-side-up image will be correctly determined.

Figure 8:
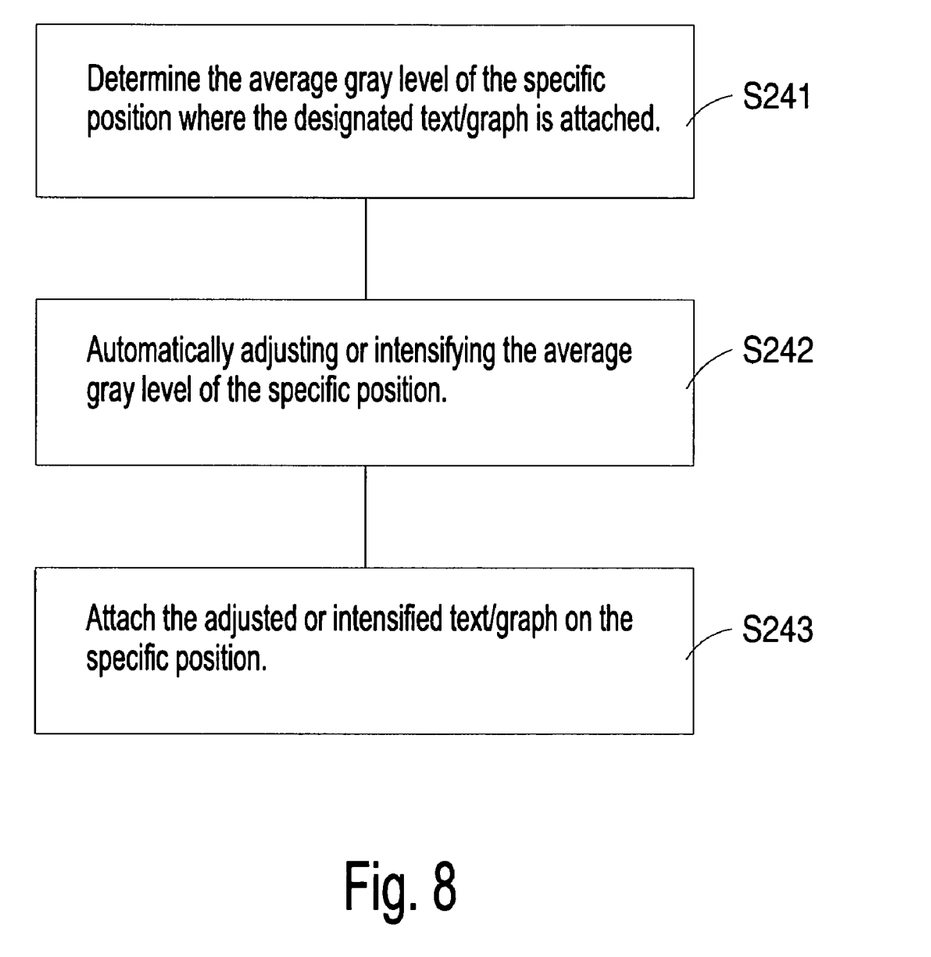
FIG. 8 is a flowchart illustrating some sub-steps of intensifying the designated text/graph.
Figure 9:
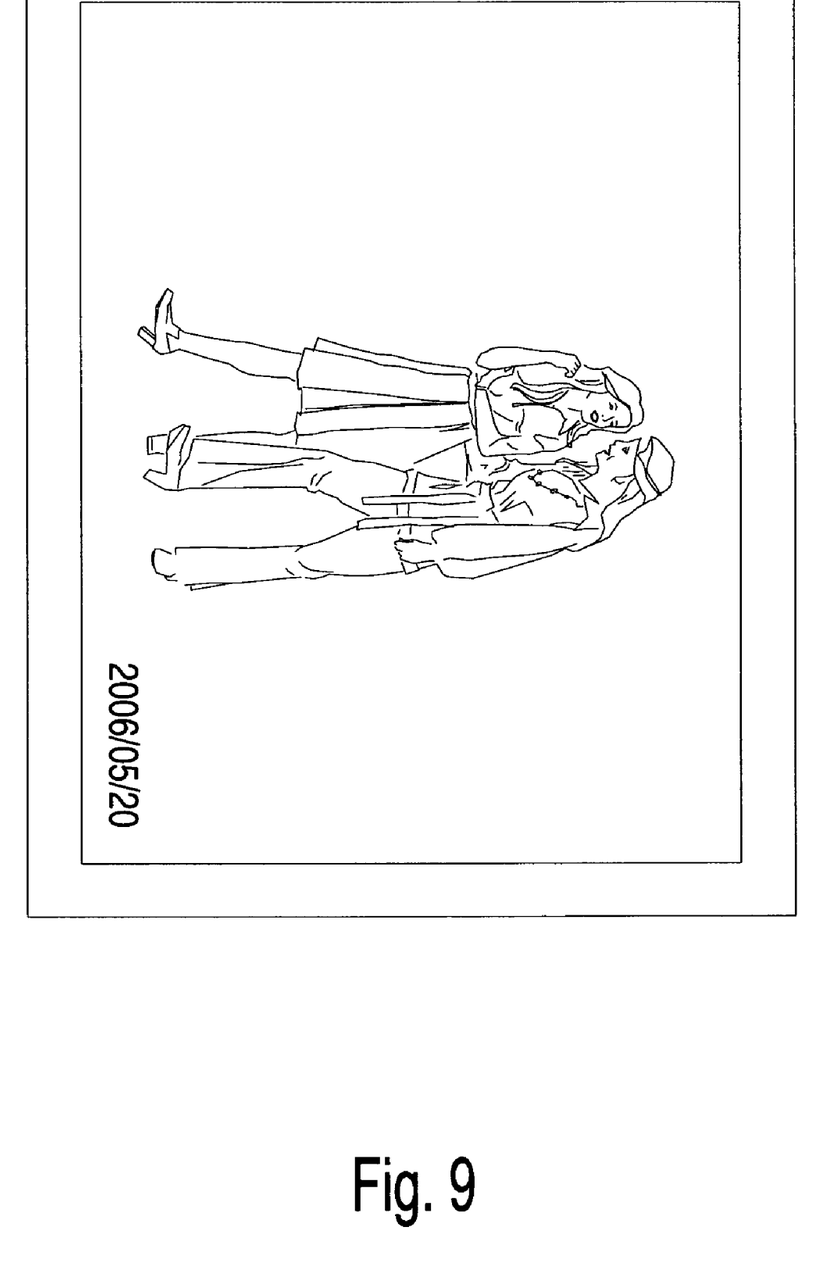
FIG. 9 schematically illustrates an image selected to be printed on a single A4 sheet according to the preset invention.

As previously described, if the color of the designated text/graph is closed to the background color, the designated text/graph will be unrecognizable. For solving this problem, the step S24 further includes the sub-steps S241, S242 and S243, which will be illustrated with reference to FIG. 8. In the step S241, the average gray level of the specific position where the designated text/graph is attached is determined. In the step S242, the designated text/graph is automatically adjusted or intensified according to the average gray level of the specific position. The adjusting or intensifying procedure includes adjusting the color or sharpness of the designated text and/or adding frame or shade on the designated text. In the step S243, the adjusted or intensified text/graph is attached on the specific position. An exemplary output picture of the right-side-up image together with the designated text/graph is illustrated in FIG. 9.

From the above description, by using the image printing method and the image printing apparatus of the present invention, the correctness of discriminating the most possible upper section is largely increased without impairing the processing speed of the image printing apparatus. Moreover, the designated text/graph may be automatically adjusted or intensified according to the average gray level of the specific position, the color or sharpness of the designated text may be adjusted and/or the frame or shade may be added on the designated text, so that the designated text/graph will be more recognizable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image processing method for use with an image printing apparatus, comprising steps of:
    (a) retrieving a specified digital image and a designated text/graph;
    (b) processing said specified digital image, thereby obtaining image information associated with a right-side-up image of said specified digital image, and comprising the sub-steps of:

(b1) dividing said digital image into at least a first region and a second region, converting the digital data of said digital image into gray levels to obtain a first average gray level of said first section and a second average gray level of said second section, and comparing said first average gray level with said second average gray level, thereby discriminating a first possible upper section of said right-side-up image;

(b2) dividing said digital image into at least a third region and a fourth region, converting the digital data of said digital image into gray levels to obtain a third average gray level of said third section and a fourth average gray level of said fourth section, and comparing said third average gray level with said fourth average gray level, thereby discriminating a second possible upper section of said right-side-up image;

(b3) comparing the gray levels of said first possible upper section with said second possible upper section, thereby discriminating a most possible upper section of said right-side-up image as said image information; and (c) automatically adjusting and attaching said designated text/graph on a specified position relative to said right-side-up image according to said image information, thereby printing said specified digital image and said designated text/graph.

2. The image processing method according to claim 1 further comprising a step of communicating said image printing apparatus with a digital image capture apparatus or a digital image storage device via a wired or wireless connection interface before the step (a).

3. The image processing method according to claim 2 wherein said image printing apparatus is a printer or a multi-function peripheral, and said digital image capture apparatus is a digital camera or a camera phone.

4. The image processing method according to claim 2 wherein said image printing apparatus is a printer or a multi-function peripheral, and said digital image storage device is a digital image converter or an electronic memory card.

5. The image processing method according to claim 1 wherein the step (a) further includes a sub-step of retrieving printing settings.

6. The image processing method according to claim 1 wherein said digital image is divided into said first region and said second region by a first separation line in the sub-step (b1), and said digital image is divided into said third region and said fourth region by a second separation line in the sub-step (b2).

7. The image processing method according to claim 6 wherein said first separation line is substantially perpendicular to said second separation line.

8. The image processing method according to claim 1 wherein the step (c) further includes a sub-step of optionally rotating said digital image by at least a right angle.

9. The image processing method according to claim 1 wherein the step (c) further includes the sub-steps of:
(c1) determining the average gray level of said specific position where said designated text/graph is attached;
(c2) intensifying said designated text/graph according to the average gray level of the specific position; and
(c3) automatically attaching said intensified text/graph on said specific position.

10. The image processing method according to claim 9 wherein said step of intensifying said designated text/graph includes adjusting the color or sharpness of the designated text and/or adding frame or shade on the designated text.

11. An image processing method for use with an image printing apparatus, comprising steps of:
(a) retrieving a specified digital image and a designated text/graph;
(b) processing said specified digital image, thereby obtaining image information associated with a right-side-up image of said specified digital image, and comprising the sub-steps of:
(b1) dividing said digital image into at least a first region and a second region, converting the digital data of said digital image into gray levels to obtain a first average gray level of said first section and a second average gray level of said second section, and comparing said first average gray level with said second average gray level, thereby discriminating a first possible upper section of said right-side-up image;
(b2) dividing said digital image into at least a third region and a fourth region, converting the digital data of said digital image into gray levels to obtain a third average gray level of said third section and a fourth average gray level of said fourth section, and comparing said third average gray level with said fourth average gray level, thereby discriminating a second possible upper section of said right-side-up image;
(b3) comparing the gray levels of said first possible upper section with said second possible upper section, thereby discriminating a most possible upper section of said right-side-up image as said image information; and
(c) automatically intensifying said designated text/graph according to said image information and attaching said intensified text/graph on a specific position relative to said right-side-up image, thereby printing said specified digital image and said designated text/graph.

12. The image processing method according to claim 11 wherein the step (c) further includes the sub-steps of:
(c1) determining the average gray level of said specific position where said designated text/graph is attached;
(c2) intensifying said designated text/graph according to the average gray level of the specific position; and
(c3) automatically attaching said intensified text/graph on said specific position.

13. The image processing method according to claim 11 wherein said step of intensifying said designated text/graph includes adjusting the color or sharpness of the designated text and/or adding frame or shade on the designated text.

14. An image printing apparatus communicated with a digital image capture apparatus or a digital image storage device, said image printing apparatus comprising:
a processing unit communicated with said digital image capture apparatus or said digital image storage device for retrieving and processing a specified digital image and a designated text/graph from said digital image capture apparatus or said digital image storage device;
a storage unit connected to said processing unit for storing therein said specified digital image and said designated text/graph; and
a printing unit connected to said processing unit and controlled by said processing unit to print said processed specified digital image and said processed designated text/graph,
wherein said processing unit performs an image processing process including steps of: (a) retrieving said specified digital image and said designated text/graph; (b) processing said specified digital image, thereby obtaining image information associated with a right-side-up image of said specified digital image, and comprising the sub-steps of: (b1) dividing said digital image into at least a first region and a second region, converting the digital data of said digital image into gray levels to obtain a first average gray level of said first section and a second average gray level of said second section, and comparing said first average gray level with said second average gray level, thereby discriminating a first possible upper section of said right-side-up image; (b2) dividing said digital image into at least a third region and a fourth region, converting the digital data of said digital image into gray levels to obtain a third average gray level of said third section and a fourth average gray level of said fourth section, and comparing said third average gray level with said fourth average gray level, thereby discriminating a second possible upper section of said right-side-up image; and (b3) comparing the gray levels of said first possible upper section with said second possible upper section, thereby discriminating a most possible upper section of said right-side-up image as said image information.

15. The image printing apparatus according to claim 14 wherein said image processing process performed by said processing unit further includes a step of (c) automatically adjusting and attaching said designated text/graph on a specified position relative to said right-side-up image according to said image information, thereby printing said processed specified digital image and said processed designated text/graph.

16. The image printing apparatus according to claim 14 wherein said image processing process performed by said processing unit further includes a step of (c) automatically intensifying said designated text/graph according to said image information and attaching said intensified text/graph on a specific position relative to said right-side-up image, thereby printing said processed specified digital image and said processed designated text/graph.

17. The image printing apparatus according to claim 14 wherein said image printing apparatus is communicated with said digital image capture apparatus or said digital image storage device via a wired or wireless connection interface.

18. The image printing apparatus according to claim 14 wherein said image printing apparatus is a printer or a multi-function peripheral, and said digital image capture apparatus is a digital camera or a camera phone.

19. The image printing apparatus according to claim 14 wherein said image printing apparatus is a printer or a multi-function peripheral, and said digital image storage device is a digital image converter or an electronic memory card.

* * * * *